May 18, 1948.  C. B. STALLSMITH  2,441,677
DETECTING AND INDICATING SYSTEM FOR EXPLOSIVE GASES
Filed April 11, 1945
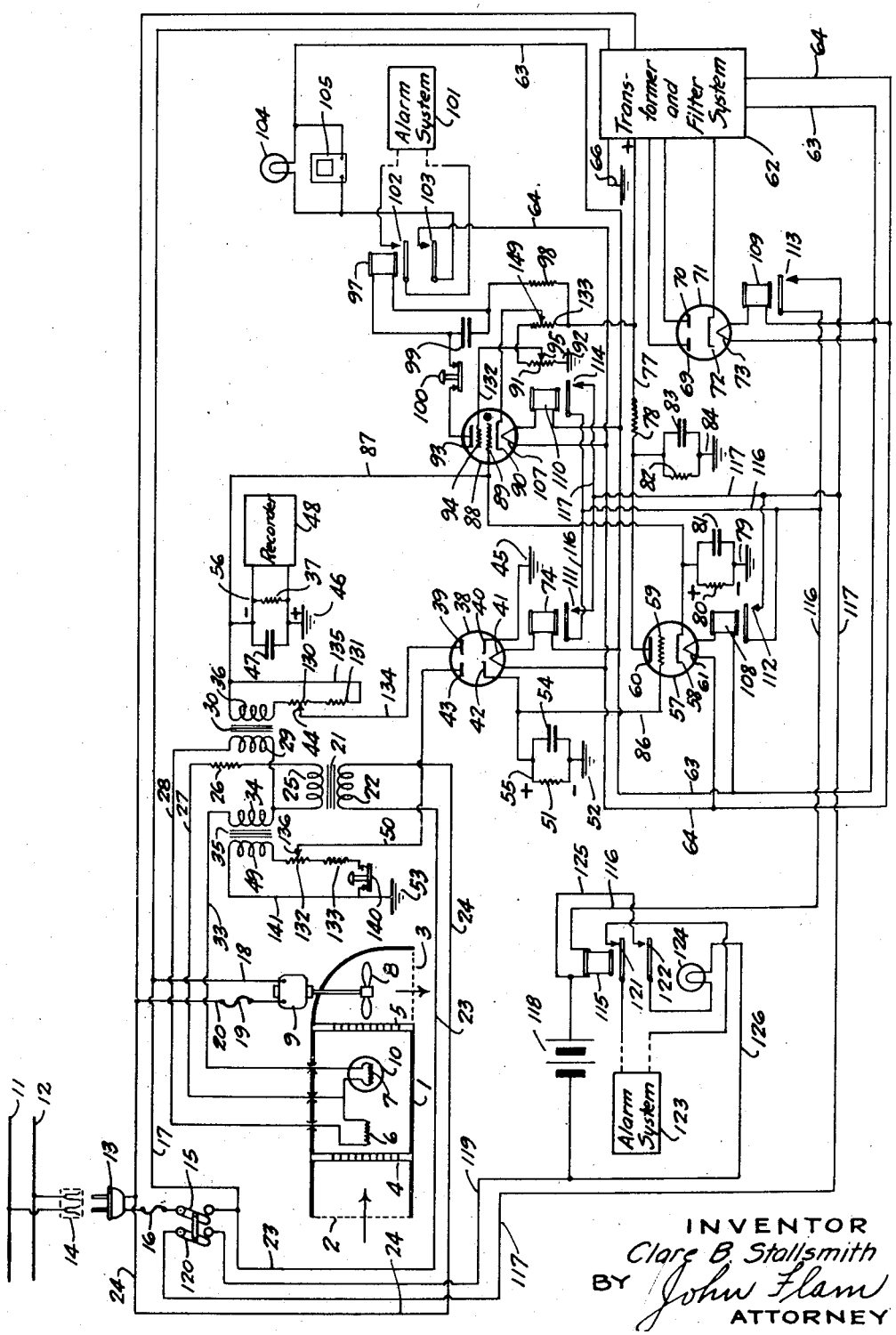
INVENTOR
Clare B. Stallsmith
BY John Flam
ATTORNEY Patented May 18, 1948

2,441,677

UNITED STATES PATENT OFFICE 2,441,677

DETECTING AND INDICATING SYSTEM FOR EXPLOSIVE GASES

Clare B. Stallsmith, Los Angeles, Calif., assignor, by mesne assignments, to Sam Abrams, Max Abrams, Ben Abrams, and Joe Abrams, Los Angeles, Calif., individually and as partners, doing business as Abrams Investment Co.

Application April 11, 1945, Serial No. 587,802

10 Claims. (Cl. 177—311)

This invention relates to the detection of gaseous mixtures. More particularly, it relates to the timely detection of dangerous mixtures of explosive gases. In this way, alarm signals are automatically energized whenever the gas mixture under test approaches a dangerous condition that may cause an explosion.

In many industrial applications, vapors or gases capable of forming an explosive mixture in the atmosphere may escape and create a serious hazard to life and property. Hazards of this character are also encountered in mines, or other subterranean localities, where gases may collect.

The timely detection of dangerous mixtures of gases before they reach an amount of concentration to be explosive has been the subject of much research. The most practical manner discovered so far in which to do this is to utilize the effect of "catalysis" on a fine platinum wire or filament of such gases. While other metals or materials besides platinum might be used for this purpose, there are many practical considerations for the choice of platinum as being the most suitable for this purpose. Use of such catalytic effect is made as follows:

The heat generated by the catalytic reaction of the gases it is desired to detect with the platinum filament causes a change in the electric resistance of the filament.

In order that such changes in temperature be made useful, the corresponding change in electric resistance of the filament is used to affect an electrical circuit. The conventional manner in which this change of electrical resistance is made useful is to connect this platinum filament in one of the branches of a "Wheatstone bridge" circuit, which circuit is well known in the electrical arts as a means of measuring differences or changes of electrical resistance.

However, there are several characteristics of the Wheatstone bridge circuit that must be observed in its use. One of these is that the arm or bridge of the circuit against which the unknown resistance is being calibrated must be accurate and the leads and all characteristics of the unknown resistance must be accurately calibrated in relationship to the other branches of the bridge circuit. Another characteristic is that when the amount of deflection of a galvanometer or null-indicating device of the Wheatstone bridge is calibrated and used as a means of indicating the amount of change of one of the arms of the bridge from a predetermined standard, the electrical current applied to the bridge must be maintained uniform in order to maintain the accuracy of such indications.

Another characteristic of the bridge circuit is that the amount of current flowing through the null-indicating device, when the bridge is not balanced, is not necessarily representative of the change in resistance in one of the branches; for example, if there was a change of .1 ampere of current in one of the arms of the bridge, there would not be .1 ampere of current flowing between the "null points" of the bridge. The current flowing between the null points of a bridge when the bridge is unbalanced is a resultant of the potential difference between the voltage drops across either pair of adjacent arms of the bridge across which the null indicator is connected.

From this characteristic it might be seen that in order to have a large indication in the null-indicating device to indicate a small change in resistance of one of the arms of the bridge, it is necessary either to have a very sensitive null indicating device or to pass large amounts of current through the arms of the bridge. Since for practical reasons the amount of current that can be passed through the arms of the bridge is limited because of the current carrying capacity of the resistors and the current supplying capacity of the power source involved it is necessary to resort either to extremely sensitive motor movements or elaborate amplifying systems to give adequate indication of bridge unbalance to use in a practical manner.

Since current-flow indicating devices of a direct reading type made for alternating currents are relatively insensitive compared to direct reading instruments designed for use on direct currents, it has, up to the present time, been found necessary to use direct current on such bridge circuits.

This difficulty is mentioned in patents previously issued on gas detecting devices.

As has been mentioned previously, one of the requirements for accuracy in use of a Wheatstone bridge is the necessity for all arms of the bridge to be accurately balanced in relationship to each other for a condition of "null." It is well known that as the amount of current flowing in a circuit increases the difficulty of accurately balancing resistors in that circuit increases. If it became necessary to change the "detector element" or filament in the conventional bridge circuit, it would be necessary to calibrate that resistance to the bridge circuit or vary one of the other branches of the bridge circuit to compensate for variations in the filament that is used for replacement. The order of currents being used in these circuits makes this an operation that is quite delicate, would require the use of highly skilled personnel and a use of highly precise equipment.

It is an object of this invention to eliminate such obstacles in the replacement of detector elements and make it possible for such elements to be replaced in the filament with very little attendant trouble.

Another difficulty that must be met in the use of a Wheatstone bridge circuit is correction for ambient temperature changes of the atmosphere in which the bridge is being used. This has been done to more or less degree by inserting in the arm opposite to the resistance being measured a resistance with a fairly high temperature coefficient. But this only takes care of the problem of ambient temperature variation to a certain degree because using change in resistance of such compensating resistor and the resistor being measured, the current flowing through the bridge will vary and means must be provided to vary the applied current directly proportional to such current change.

In dealing with a very small order of currents this could be done in a practical manner in several different ways but the range of currents required in devices of this nature preclude the use of such means for maintaining constant current to the bridge; hence all devices using such Wheatstone bridge circuits must either be used in an atmosphere of a predetermined temperature, or correction factors be applied for use of such devices in ambient temperatures other than for which the device was calibrated.

Another weakness or difficulty encountered in the use of the Wheatstone bridge is the amount of power available developed across the null points of the bridge for the purpose of operating alarms or signal devices. Since such alarm control circuits must of necessity operate on very small amounts of power, it has been customary in most present-day devices to use a very small sensitive direct indicating type of meter as a null indicator which has included in it a means for controlling an electrical circuit. Since any of the changes mentioned in the preceding paragraphs will cause an error in the accuracy of indication of such meters, it follows that the control of any circuits by such meters will be changed with changes in applied current or ambient temperature. The peculiar construction of such current-control current indicating devices is such that there is a minimum accuracy of control that can be depended upon. Such current control action most often depends upon a small magnet being held on an arm which is adjustable to a predetermined position and which attracts a small piece of steel affixed to the instrument pointer; since all magnets change their coercive force with age, the leeway of adjustment permissible varies with time, thus introducing additional error.

Another weak point of such direct indicating and current control devices is the use of a permanent magnet in the movement of such devices which is bound to change in time. A third point in the use of the aforementioned system is that the use of these devices on commercial alternating current requires the use of some means of rectifying to furnish direct current for the operation of the bridge. Since all present means of such rectification systems are subject to variation or change, this means that the current applied to the bridge circuit would change in value and hence change the accuracy of indication of resistance change of any of the arms of the bridge.

It is one of the objects of this invention to make it possible in a simple and reliable manner to compensate for variations in ambient temperature.

It is another object of this invention to make use of alternating current to eliminate the need for rectifiers and voltage regulators.

It is another object of this invention to use the small change in resistance occurring in the platinum wire in a practicable manner without the need of extremely delicate or sensitive instruments.

It is another object of this invention to provide a means of testing the operativeness of this system.

The catalytic action of a gaseous constituent is also dependent upon the specified gas or gases that must be detected. Accordingly, the mere choice of a different resistance is insufficient to insure accurate indication of dangerous explosive mixtures. On the contrary, some adjustment must be made for the type of gas involved. It is therefore another object of this invention to make it possible readily to adjust the apparatus for such differences in the types of said gases and especially by providing adjustments of the circuits associated with electronic emission devices.

The temperature change caused by catalytic action of a gaseous constituent also varies with the temperature of the platinum filament. By that is meant that the amount of temperature change caused by such catalytic action at one temperature is different for the catalytic effect of the same percentage of gaseous constituent at another temperature of the filament.

It is another object of this invention to provide a means for automatically compensating for this difference in amount of change of temperature on the detector filament caused by catalytic action of gaseous constituents.

It is still another object of this invention to provide a compact system of this character, and particularly by the employment of the electronic emission device to utilize the relatively small current variations resulting from temperature variations caused by variations in the constituents of the atmosphere being tested.

This invention possesses many other advantages and has other objects which may be made more clearly apparent from a consideration of one embodiment of the invention. For this purpose there is shown a form in the drawings accompanying and forming a part of the present specification. The form will now be described in detail, illustrating the general principles of the invention, but it is to be understood that this detailed description is not to be taken in a limited sense. The scope of this invention is best defined by the appended claims.

Referring to the drawings the single figure is a diagrammatic representation of a system incorporating the invention.

The detector system is intended to be used in a locality where explosive mixtures may occur, such as in the hold of a vessel, subterranean passages, in factories where explosive gases are utilized, or out in the open.

An apparatus 1, for sampling the atmosphere, is shown adjacent the upper left-hand corner of the figure. This apparatus is placed so that a current of air can pass through it. Accordingly, It is essentially a conduit having an intake and an outlet opening. There are provisions for preventing the spread of any flames in the event an explosive mixture in the apparatus 1 be ignited by the creation of heat in the sampling apparatus. The air is intended to enter through a screen 2 and to pass out of the sampling apparatus through a screen 3.

Within the apparatus 1 are located a pair of flame arresters, or barriers 4 and 5, between which are located a pair of filamentary elements 6 and 7, such as annealed platinum adapted to be heated to an initial temperature by application of an alternating current. The apparatus also includes a fan 8 for inducing the current of air through the apparatus. The fan is shown as driven by an electric motor 9. This fan and motor are used where there would not be sufficient movement of room atmosphere or sufficient diffusion of constituent gases to affect the detector filaments in a reasonable length of time. It may be desired to insert the filaments in a vent where there are strong currents of air or in places where there would be a high rate of diffusion of gases.

The elements 6 and 7 are filamentary in character and are wound to a spiral to condense their size. As is well known, element 6, which is exposed to the constituent atmosphere, is capable of "catalytic" reaction as previously described.

In the present instance, this known property is utilized for setting an alarm system into operation when the concentration of the explosive gaseous constituent in the atmosphere reaches a value dangerously close to the explosive range of concentration. The range of concentration in which flame propagation is so rapid as to be classed as an explosion is readily determinable; and, accordingly, the corresponding temperature range attained by element 6 results in a definite corresponding variation in resistance of the element.

While the element 6 is exposed to the atmosphere, the element 7 is enclosed in a vessel 10 in which there is an inert gas, such as nitrogen. The elements 6 and 7, with supplemental apparatus to be hereinafter described, are accurately matched with each other so that element 7 has identical resistance with element 6 when their temperatures are equal; and furthermore, due to the use of an inert gas filling in good thermal contact with the external atmosphere, the element 7 is subjected to the temperature of the circumambient atmosphere.

Accordingly, the difference in temperatures of elements 6 and 7 can only be caused by catalytic action of element 6, causing a difference of its resistance which, in turn, may be used to measure the concentration of explosive gases. Therefore, by aid of the variation in differences in resistance between these two elements, we can determine whether the atmosphere to which element 6 is exposed is dangerously close to an explosive mixture.

Electric power for the operation of the entire system is supplied by the mains 11 and 12 connected to a commercial source. A plug 13 is intended to be received in a receptacle 14 for connecting the system to the mains.

The motor 9 is energized from the mains by operation of a switch 15. Thus, the circuit for the motor 9 may be traced as follows: main 11, left-hand portion of receptacle 14, left-hand prong of plug 13, fuse 16, switch 15, connections 17 and 18, motor 9, another fuse 19, conductor 20, right-hand prong of plug 13, right-hand portion of receptacle 14, to main 12.

The alternating current passing through elements 6 and 7 is supplied through an appropriate step-down transformer 21, that provides an electromotive force of about six volts across the filaments. The primary winding 22 of this transformer is fed from the mains 11 and 12 through the following circuit: main 11, receptacle 14, plug 13, fuse 16, switch blade 15, conductor 23, primary winding 22, conductor 24, plug 13, receptacle 14 to main 12. The secondary winding 25 of transformer 21 is connected to supply current to the elements 6 and 7 in parallel. Thus, the circuit for the exposed element 6 may be traced as follows: from the right-hand terminal of winding 25, a resistance 26, conductor 27, element 6, conductor 28, primary winding 29 of a transformer 30, to the left-hand terminal of secondary winding 25. Resistance 26 has a value determining the desired current through the elements 6 and 7.

The circuit for element 7 is traced from secondary 25, through resistance 26, conductor 27, element 7, conductor 33, primary winding 34 of a transformer 35, back to the transformer winding 25.

When an explosive gas mixture is present, the temperature of element 6 increases, while the temperature of element 7 is unaffected by the gaseous constituent. Accordingly, the resistance of element 6 is increased, and the current flow through it is reduced. The primary winding 29 thus carries less current than before. This inequality of current flow is then effective to operate an electronic emission device, such as a thyratron 88, which causes an alarm system to operate. The mode of operation of this device 88 will be described hereinafter.

The manner in which the controlling potential differences are obtained by aid of transformers 30 and 35 will now be described. Secondary winding 36 of transformer 30 supplies current to resistors 130 and 131 in series. A portion of the secondary current, however, is shunted so as to be rectified by the aid of a double diode rectifier tube 38.

Similarly, the secondary winding 49 of transformer 35 supplies current to resistors 132 and 133 in series. A portion of the secondary current, however, is shunted so as to be rectified by the aid of the left-hand portion of tube 38.

The right-hand set of electrodes in tube 38 includes a plate or anode 39 and a heated cathode 40. The cathode 40 is heated by the heater 41, supplied with electric energy in a manner to be hereinafter described. The heater 41 supplies heat as well for the cathode 42 for the left-hand portion of the tube 38. This left-hand portion of the tube 38 is provided with a plate or anode 43.

The rectifying circuit for a portion of the current flowing through the winding 36 may be traced as follows: from the lower terminal of winding 36, through a portion of resistor 130, tap 44, conductor 134, anode 39, cathode 40, ground 45, ground 46, resistance 37, back to the upper terminal of winding 36. By-pass condenser 47 may be placed in parallel to the resistance 37. These connections are such that the upper terminal 56 of resistance 37 is negative with respect to ground.

Paralleling the rectifier electrodes 39 and 40 is a circuit including that portion of resistor 130 which is below tap 44, resistor 131, and connection 135 to the upper terminal of winding 36. By adjusting tap 44, the quantity of rectified current is adjusted. Furthermore, the resistor 130 can be made much smaller than resistor 131 in order to provide a fine adjustment. For example, while resistor 131 may be as high as 20,000 to 25,000 ohms, resistor 130 is made from about 750 to 1,000 ohms. By adjustment of tap 44, therefore, proper calibration of the circuits associated with filament 6 may be obtained.

The rectified current flowing through resistance 37 is a measure of the temperature of the element 6. Accordingly, the potential difference across the resistance 37 is also a measure of that temperature. If desired, a continuously operating graphic recorder 48 of any desired type may be connected across the resistance 37, which by appropriate calibration indicates and records the concentration of the explosive gas in the air stream.

A portion of the current through the secondary winding 49 of the transformer 35 is rectified by aid of the left-hand electrodes 42—43 of the double diode 38. This rectifying circuit may be traced as follows: from the lower terminal of the winding 49, through a portion of resistor 132, tap 136, conductor 50, electrodes 43 and 42, resistance 51, ground 52 and ground 53 to the upper terminal of the winding 49. As before, a by-pass condenser 54 may be connected across the terminals of resistance 51.

The connections to the transformer winding 49 are such that the upper terminal 55 of resistance 51 is positive with respect to ground.

Paralleling the rectifier electrodes 42 and 43 is a circuit including that portion of resistor 132 which is below tap 136, resistor 133, push button 140, and connection 141 to the upper terminal of winding 49. By adjustment of tap 136, the quantity of rectified current is adjusted. Again, the adjustment may be made fine by choosing resistor 132 of low value with respect to resistor 133; for example, resistor 132 can be from 750 to 1,000 ohms, and resistor 133 can be from 20,000 to 25,000 ohms.

By adjustment of taps 44 and 136, the drops across resistors 37 and 51 are equal when the stream of air through the apparatus 1 has no explosive gaseous constituent therein.

When push button 140 is operated, the current that is rectified through electrodes 42, 43 is increased, since the circuit paralleling these electrodes is opened. There is accordingly a rise in voltage across resistance 51. This has the same effect as a decrease in voltage across resistor 37, which may be caused by a dangerous explosive condition. This affords a means of quickly checking the operation of the unit to see whether it is in condition to respond to such conditions.

The currents flowing through resistances 37 and 51 may be directly opposed to create a controlling potential for the thyratron 88. These resistances may also be of the order of 25,000 ohms. If, due to these currents, the potential differences across these resistances are equal, the thyratron is unaffected. If, however, the potential difference across resistance 37 is reduced due to the reduction in current flow through transformer winding 36, then there is a potential effective to operate the thyratron 88. How these potential differences are utilized will be explained hereinafter.

As heretofore mentioned, the temperature attained by the exposed element 6, when subjected to a mixture including an explosive gas constituent, depends upon the temperature that would be attained by the exposed element when heated by the alternating current, and in an innocuous atmosphere. The lower this initial temperature is, the greater the catalytic action for the same concentration. There is apt to be some variation in the electromotive force available across mains 11 and 12, and which, in turn, causes a variation in the heating currents. Ordinarily, the variation is so small that it may be ignored, and by proper choice of the design of transformers 30 and 35, the errors caused by line voltage variation may be greatly reduced. However, in this instance, further automatic compensation is provided for.

Thus, assuming that there is a reduction in the electromotive force considerably below normal, a reduction in the initial temperature of element 6 results, and therefore, an increased catalytic action. Accordingly, at any specific concentration of the gaseous constituent, the increase over the initial temperature is greater, and there is a greater difference between the drops across resistances 37 and 51. To maintain this differential at the same value as when the electromotive force across mains 11 and 12 is at the normal value, use is made of a compensating circuit, including the electronic emission amplifier device 57.

This device is shown as a triode having an indirectly heated cathode 58, a control electrode or grid 59, and an anode or plate 60. The cathode 58 is shown as heated by a heater 61 which is supplied with a heating current in a manner to be hereinafter described.

The direct current plate potential is obtained by aid of a rectifier system of conventional design.

The rectifier system is energized through a transformer and filter system 62, from mains 11 and 12 by way of plug 13, fuse 16, and switch blade 15. The power supply also includes a double diode rectifier 71, having the anodes 69, 70, and a cathode 72 which is indirectly heated by the heater 73, energized by the transformer and filter system 62. The output of the rectifier system includes the conductor 77, corresponding to a potential above ground, and the ground connection 66.

We may now consider how amplifier 57 is used to reduce the effect of variations in the electromotive force across mains 11 and 12. For this purpose, values by way of an example may be assigned to the factors entering into this problem.

Let us assume that there is present a 5 percent mixture of explosive gases in the atmosphere being investigated; that the catalytic effect of these gases on element 6 is increased by 20 percent at the lower operating temperature caused by a line voltage reduction or ambient temperature reduction.

Accordingly, in order to compensate for this increased catalytic action, it is necessary to cause the control electrode 89 of thyratron 88 to maintain this thyratron inactive for this 20 percent increase over normal catalytic action. Since this control electrode is maintained negative with respect to cathode 90 until the triggering action occurs, this compensation requires that an additional negative bias be placed on grid 89; this negative voltage is measured so as to retard the decrease of negative potential by 20 percent of such grid voltage changes as normal operation. Thus for example, for normal line voltage, a potential change on grid 89 of +.1 volt is required to indicated the presence of the 5 percent mixture of gas; then for a reduced line voltage or reduced ambient temperature, the same mixture of gas applied to element 6 causes a potential change on grid 89 of +.1 volt + 20 percent of .1 volt, or +.12 volt. Therefore, in some way, a compensating .02 volt must be created.

For this purpose, the electronic emission tube 57 is utilized. Proper plate supply to plate or anode 60 of this tube is obtained by aid of the voltage divider made up of resistors 78 and 82, and ground 84 connected to the positive potential conductor 77 of the power supply system. Condenser 83 provides additional filtering of the plate supply.

Cathode 58 is grounded at ground 79 through a resistor 80, which is bridged by another filtering condenser 81. By proper selection of this resistor 80, voltage changes produced across it due to voltage changes on grid 59 of tube 57, may be such as required for the compensation.

When the system is operating on normal line voltage (say 115 volts) and in a gas-free atmosphere, the voltage across resistor 80 is equal to, but opposite in polarity to the voltage across resistor 37. Hence the signal voltage on grid 89 of tube 88 is zero. This signal voltage is impressed by aid of connection 87. In the presence of gas, when element 6 will be affected, the voltage across resistor 37 is less than the voltage across resistor 80, and a positive potential corresponding to the difference is impressed on grid 89.

But the voltage across resistor 80 is also a function of the voltage across resistor 51. This is so because the drop across resistor 51 is effective on the grid 59 of tube 57, by way of connection 86, and thereby this drop controls the plate current through resistor 80.

Now, should the line voltage or ambient temperature decrease, thus lowering the temperature of elements 6 and 7, the drops across resistors 51 and 37 will each be reduced in the same proportion as the line voltage or ambient temperature. However, due to the amplification factor of tube 57, there will be a greater change in voltage across resistor 80 than across resistor 37 or 51. Therefore, instead of a zero signal potential on grid 89 of tube 88, there will appear a negative voltage. This means that a greater change in voltage (due to presence of an explosive gas) will be necessary across resistor 37 to cause tube 88 to "fire." This greater change occurs as a result of the increased catalytic action at the lowered filament temperatures.

Similar but opposite effects occur when the line voltage or ambient temperature increases. In that case, the change in voltage across resistor 80 is in a positive direction and is again greater than the change in voltage across resistor 37 or 51.

The connections for the thyratron 88 may now be more particularly specified. It is now well known that, when a definite potential difference exists between grid 89 and the cathode 90, a heavy space current flows between the anode 93 and the cathode; and this continues to flow even after the control grid potential would no longer be capable of initiating the current flow.

The cathode 90 is heated by a heater 107, supplied with current in a manner to be hereinafter described. The plate or anode 93 is kept at a positive potential by being connected to lead 77 through a circuit interrupting push button 100, a relay coil 97, and a resistance 98. A by-pass condenser 99 is placed in parallel to the relay coil 97. Resistance 98 serves to place the potential of the plate 93 with respect to the cathode 90 at the desired value. The cathode 90 is grounded through resistances 91 and 133. These resistances are shown as potentiometer resistances connecting the positive lead 77 to ground. By aid of the tap 149, the potential of cathode 90 above ground may be determined. Adjustment of tap 149 is required to determine the sensitivity of the thyratron 88.

We may now return to the controlling function of grid 89, and the derivation of a controlling potential. Normally, since there is a drop across both resistances 37 and 80, a current can flow from the positive side of resistance 80, through ground connections 79, 46, resistance 37, and connection 87, back to resistance 80. Grid 89 is connected, via connection 87, to the negative side 56 of resistance 37, and to the positive side of resistance 80. Cathode 90 is connected, via resistance 91 and ground connections 92, 46 and 79, to the positive side of resistance 37 and the negative side of resistance 80.

It may readily be demonstrated that, when the drops across these resistances 37 and 80 are equal, the potential of grid 89 with respect to cathode 90 depends upon the potential of tap 149 above ground. The grid potential is negatively biased by that drop. This is sufficient to keep the thyratron inactive. Now, if the drop across resistance 37 is reduced, the potential of grid 89 moves toward positive; and, if the reduction is sufficient (due to catalytic action of element 6) the grid 89 "triggers" the thyratron, and a heavy current flow results. This is made to occur at a definite concentration of the explosive gases. The flow of current can be stopped by operation of push button 100. Ordinarily, a decrease of the drop across resistance 37 of about one volt is sufficient to set the thyratron 88 into operation.

The trigger action may be adjusted to take place optionally at any per cent value of the concentration corresponding to the lower explosive level. This is mainly accomplished by adjustment of tap 149 on resistance 133. However, another adjustment is provided by aid of the suppressor grid electrode 94. The potential of this grid also affects the potential that grid 89 must reach to set the device into operation. To adjust this potential of grid 94, a tap 95 on resistance 91 is connected, as by lead 132, to the grid 94. Adjustment of tap 95 on the relatively high resistance 91 is most useful for adjusting the response of the thyratron 88 to a specific type of gas; and tap 149 on the relatively low resistance 133 is most useful to adjust for the percentage concentration.

Relay 97, when energized, operates an alarm system 101 by aid of the relay contacts 102. This alarm system 101 may be at a remote point from the installation. A local alarm system which may include a lamp 104 and a buzzer 105 may be operated upon energization of the relay coil 97 through another set of relay contacts 103. This set of contacts connects the signaling devices 104 and 105 to a pair of low voltage leads 63, 64 coming out of the transformer and filter system 62.

The leads 63, 64 also serve to energize the heaters 41, 61, 73, and 107 of the four electronic emission devices used. All of these heaters are connected in parallel across leads 63, 64. The arrangement is furthermore such that, should any one of the heater circuits be interrupted or broken for any reason, a signalling system will be set into operation. An interruption in the supply of electrical energy to the system will also affect an alarm system.

For this purpose, each of the heater circuits includes a relay coil in series with the heater. Thus, the heater circuit for heater 41 includes the relay coil 74; the heater circuit for heater 61 includes a relay coil 108; the heater circuit for heater 73 includes the relay coil 109; and, finally, the heater circuit for heater 107 includes a relay coil 110. Each of these coils has a set of back contacts 111, 112 113, or 114, which is open when the corresponding relay is energized, and closed in the event the heater circuit is opened, deenergizing the relay coil. Dropping of the armatures of any one or more of the relays will, therefore, close the circuit of a relay 115. This circuit includes the conductors 116 and 117 across which all of the sets of relay contacts 111, 112, 113, and 114 are connected. The relay circuit may then be traced from any of the closed contacts through connection 16, coil 115, an auxiliary source of power, such as the battery 118, connection 119, switch blade 120, and back to connection 117. Blade 120 forms, with blade 15, a double pole single throw switch. Accordingly, whenever the system is set into operation by closure of switch 15, the relay circuit just traced will be set to operate in the event of failure of any one of the heater circuits.

When the relay 115 is energized, sets of contacts 121 and 122 are closed. One set 121 controls an alarm system 123 at a remote station. The other set of contacts 122 controls the energization of a signalling lamp or other signal 124, through battery 118 and connections 125 and 126.

The mode of operation of the system may now be briefly stated. While the stream of air flowing through apparatus 1 is free of an explosive constituent, the elements 6 and 7 are heated to the same degree by the alternating current source represented by the transformer 21. Accordingly, the drops across the resistances 37 and 80 are balanced. The control electrode 89 of the device 88 has a potential preventing the flow of current to the plate 93. Accordingly, relay coil 97 is deenergized.

In the event the atmosphere to which the element 6 is subjected carries a gaseous constituent that approaches closely to an explosive stage, the temperature of element 6 is increased above that of element 7. The drop across resistance 37 is then reduced, while that across resistance 80 stays the same. This reduces the negative potential of grid 89 sufficiently to permit the thyratron to operate. The alarm system 101, and the visible and audible signals 104 and 105, are all energized. They remain energized until push button 100 is operated.

By operation of push button 140, the system may be tested, since then a heavier current is permitted to be rectified by device 38, and this heavier current raises the potential of point 55. This in turn increases the drop across resistance 80, and therefore increases the potential on grid 89 of the thyratron 88 to a triggering value.

When the electromotive force of the source of energy varies, the result is a variation in the catalytic action of the element 6. This is automatically compensated for by the use of the triode 57 which operates to maintain the potential of the control electrode 89 at the same value within a wide range of variation of the power lines.

The inventor claims:

1. In a system adapted to respond to the presence of an explosive gaseous constituent in the atmosphere, and including a pair of similar filamentary elements, one exposed to the air at the locality under test, and heated by catalytic action by the presence of an explosive gaseous constituent, and the other element being enclosed in an inert gaseous atmosphere free of explosives, and subjected to substantially identical temperature conditions as the exposed element: the combination therewith of means for passing an alternating current through said elements in parallel circuits, said current serving to raise the temperatures of the elements to proper operating temperature to increase the resistance of the elements; a pair of transformer means respectively associated with the parallel circuits for deriving currents corresponding to the resistances of the elements; a rectifier and a resistance in series with each of said transformer means; means for placing in opposition, the potential differences across said resistances; and an electronic emission device responding to the opposed potential differences and initiated into operation upon sufficient excess of one potential difference over the other.

2. In a system adapted to respond to the presence of an explosive gaseous constituent in the atmosphere, and including a pair of similar filamentary elements, one exposed to the atmosphere at the locality under test, and heated by catalytic action by the presence of an explosive gaseous constituent, and the other element being enclosed in an atmosphere free of explosive gases, and subjected to the same temperature conditions as the exposed element: the combination therewith of means for passing an alternating current through said elements in parallel circuits, said current serving to raise the temperatures of the elements and thereby to increase the resistance of the elements; a pair of transformer means respectively associated with the parallel circuits for deriving currents corresponding to the resistances of the elements; a rectifier and a resistance in series with each of said transformer means; means for placing in opposition, the potential differences across said resistances; an electronic emission device responding to the opposed potential differences and initiated into operation upon sufficient excess of one potential difference over the other; and an alarm system controlled by said electronic emission device.

3. In a system adapted to respond to the presence of an explosive gaseous constituent in the atmosphere, and including a pair of similar filamentary elements, one exposed to the atmosphere at the locality under test, and heated by the catalytic action of the explosive gaseous constituent, and the other element being enclosed in an inert gaseous atmosphere free of explosives, and subjected to substantially identical temperature conditions as the exposed element: the combination therewith of means for passing an alternating current through said elements in parallel circuits, said current serving to raise the temperatures of the elements and thereby to increase the resistance of the elements; a pair of transformer means respectively associated with the parallel circuits for deriving currents corresponding to the resistances of the elements; a rectifier and a resistance in series with each of said transformer means; a first electronic emission device controlled in accordance with variations in the potential difference across one of the resistance; an output circuit for said electronic emission device, including an impedance, the drop across said impedance being opposed to the drop across the other resistance, and so arranged that variations in electromotive force of the source of supply result in no substantial variation in the effective value of the potential difference resulting from the opposed drops; and a second electronic emission device responding to said effective value.

4. In a system adapted to respond to the presence of an explosive gaseous constituent in the atmosphere, and including a pair of similar filamentary elements, one exposed to the atmosphere at the locality under test, and heated partly by catalytic action of an explosive gaseous constituent, and the other element being enclosed in an inert gaseous atmosphere free of explosives, and subjected to substantially identical temperature conditions as the exposed element: the combination therewith of means for passing an alternating current through said elements in parallel circuits, said current serving to raise the temperatures of the elements and thereby to increase the resistance of the elements; a pair of transformer means respectively associated with the parallel circuits for deriving currents corresponding to the resistances of the elements; a rectifier and a resistance in series with each of said transformer means; a first electronic emission device controlled in accordance with variations in the potential difference across one of the resistance; an output circuit for said electronic emission device, including an impedance, the drop across said impedance being opposed to the drop across the other resistance, and so arranged that variations in electromotive force of the source of supply result in no substantial variation in the effective value of the potential difference resulting from the opposed drops; a second electronic emission device responding to said effective value; and an alarm system controlled by said second electronic emission device.

5. In a device of the character described, an element the resistance of which is a function of its temperature; a circuit for passing an alternating heating current through said member; a transformer having a primary winding included in said circuit, as well as a secondary winding; a rectifier fed from the secondary winding; a first resistor fed with current from the rectifier to produce a potential drop across the resistance; a second resistor; means for causing a direct current potential drop across said second resistor; and control means responsive to the difference in the potential drops; and operative upon a predetermined differential between said potential drops.

6. In a device of the character described, an element tthe resistance of which is a function of its temperature; a circuit for passing an alternating heating current through said member; a transformer having a primary winding included in said circuit, as well as a secondary winding; a rectifier fed from the secondary winding; a first resistor fed with current from the rectifier to produce a potential drop across the resistance; a second resistor; means for causing a direct current potential drop across said second resistor; control means responsive to the difference in the potential drops; and operative upon a predetermined differential between said potential drops; and means for testing said system by increasing the potential drop across said second resistor.

7. In a device of the character described: a pair of elements the resistances of which are functions of their temperatures; a circuit having parallel branches respectively for passing an alternating heating current through said elements; a pair of transformers having primary windings respectively in said branches, and having secondary windings; rectifier means supplied by said secondary windings; a pair of resistors respectively fed from said secondary windings; means providing an adjustable load for each of said secondary windings; and control means operating in response to the differential in the potential differences produced respectively by said loads across said resistors.

8. In a device of the character described: a pair of elements the resistances of which are. functions of their temperatures; a circuit having parallel branches respectively for passing an alternating heating current through said elements; a pair of transformers having primary windings respectively in said branches, and having secondary windings; a pair of rectifier means respectively supplied by said secondary windings; a pair of resistors respectively fed from said secondary windings; at least a part of each of said resistors being in series respectively with a rectifier means; means providing an adjustable load for each of said secondary windings; control means operating in response to the differential in the potential differences across said resistors; and means for open-circuiting the adjustable load for one of said secondary windings.

9. In a system of the character described: a pair of resistors; means utilizing an impressed electromotive force for creating a potential drop across each resistor; means whereby the differential in said potential drops is a function of the electromotive force; a third resistor; and means operating in response to a change in electromotive force for maintaining the differential between the drop across said third resistor and one of the other resistors, independently of the variation in electromotive force.

10. In a system of the character described: a pair of resistors; means utilizing an electromotive force for creating a potential drop across each resistor; means whereby the differential in said potential drops is a function of the electromotive force; a third resistor; and means operating in response to a change in electromotive force for maintaining the differential between the drop across said third resistor and one of the other resistors, independently of the variation in electromotive force, comprising an electronic emission device having a control electrode and a cathode, an output circuit for the device and including said third resistor, and means for impressing the potential drop across one of the said pair of resistors, between the control electrode and the cathode.

CLARE B. STALLSMITH.

REFERENCES CITED

The following references are of record in the file of this patent:

UNITED STATES PATENTS

| Number | Name | Date |
| --- | --- | --- |
| 1,917,417 | Zuschlag | July 11, 1933 |
| 1,953,244 | Luckey et al. | Apr. 3, 1934 |
| 1,969,518 | Moles | Aug. 7, 1934 |
| 2,372,530 | Sommermeyer | Mar. 27, 1945 |

FOREIGN PATENTS

| Number | Country | Date |
| --- | --- | --- |
| 129,741 | Great Britain | July 24, 1919 |
| 139,103 | Great Britain | Feb. 26, 1920 |